United States Patent
von Birgelen et al.

(10) Patent No.: US 10,627,000 B2
(45) Date of Patent: Apr. 21, 2020

(54) DEVICE FOR CONTROLLING OR REGULATING THE THROUGH-FLOW AMOUNT AND/OR THROUGH-FLOW DIRECTION OF FLUIDS

(71) Applicant: SIG Technology AG, Neuhausen am Rheinfall (CH)

(72) Inventors: Bernd von Birgelen, Waldfeucht (DE); Leonhard Sylvester Göttgens, Aachen (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 0 days.

(21) Appl. No.: 15/307,635

(22) PCT Filed: Mar. 31, 2015

(86) PCT No.: PCT/EP2015/056998
§ 371 (c)(1),
(2) Date: Oct. 28, 2016

(87) PCT Pub. No.: WO2015/165676
PCT Pub. Date: Nov. 5, 2015

(65) Prior Publication Data
US 2017/0051838 A1    Feb. 23, 2017

(30) Foreign Application Priority Data

Apr. 29, 2014    (DE) .................... 10 2014 106 010

(51) Int. Cl.
*F16K 11/18*    (2006.01)
*F16K 1/20*    (2006.01)
*F16K 11/052*    (2006.01)

(52) U.S. Cl.
CPC ............ *F16K 11/18* (2013.01); *F16K 1/2021* (2013.01); *F16K 11/052* (2013.01)

(58) Field of Classification Search
CPC ....... F16K 11/18; F16K 11/052; F16K 1/2021
(Continued)

(56) References Cited

U.S. PATENT DOCUMENTS 1,858,246 A * 5/1932 Mahan .................. F16K 11/052
                                                     137/597
2,244,986 A * 6/1941 Drane .................... F16K 1/2028
                                                     137/122

(Continued)

FOREIGN PATENT DOCUMENTS

CN    101265986 A    9/2008
CN    101432514 A    5/2009
(Continued)

*Primary Examiner* — Kevin L Lee
(74) *Attorney, Agent, or Firm* — The Webb Law Firm

(57) ABSTRACT

A device for controlling or regulating the through-flow amount and/or through-flow direction of fluids, includes: a housing with at least two inlets and/or outlets, at least one arm, which is movably arranged within the housing, and at least one closure element, which is arranged within the housing and is movably connected with the arm. The arm and the closure element connected therewith are arranged and connected with one another such that at least one inlet and/or outlet is able to be closed off by the closure element. The closure element and/or at least one inlet and/or outlet has a curved sealing surface for sealing the inlets and/or outlets. In order to achieve a high degree of mobility of the closure element in the stressed state with simultaneous defined alignment of the closure element in the relieved state, a pre-stressed spring element is arranged between the arm and the closure element.

20 Claims, 8 Drawing Sheets

(58) Field of Classification Search
USPC .................................................. 137/871, 875
See application file for complete search history.

(56) References Cited

U.S. PATENT DOCUMENTS

| | | | |
|---|---|---|---|
| 2,441,253 A | 5/1948 | Sarver | |
| 2,486,825 A | 11/1949 | De Baufre | |
| 3,173,356 A | 3/1965 | Schierse et al. | |
| 3,828,820 A * | 8/1974 | Schrader | F16K 11/056 137/625.4 |
| 4,253,485 A * | 3/1981 | Legille | F16K 3/22 137/315.16 |
| 5,908,047 A | 6/1999 | Nakamura et al. | |
| 7,611,125 B2 * | 11/2009 | Ott | F16K 29/00 251/118 |
| 2003/0051759 A1 | 3/2003 | Schmidt et al. | |
| 2008/0169026 A1 * | 7/2008 | Sanchez | F16K 11/052 137/1 |
| 2009/0050830 A1 | 2/2009 | Albert et al. | |

FOREIGN PATENT DOCUMENTS

| | | |
|---|---|---|
| CN | 201875199 U | 6/2011 |
| CN | 203532850 U | 4/2014 |
| DE | G9003542.9 U1 | 5/1990 |
| DE | 4038714 A1 | 6/1991 |
| DE | 19831272 A1 | 1/2000 |
| DE | 10053850 A1 | 5/2002 |
| DE | 102010018674 A1 | 11/2011 |
| FR | 2660396 A1 | 10/1991 |
| FR | 2701292 A1 | 8/1994 |
| JP | 5269638 U1 | 5/1977 |
| JP | 52150031 U1 | 12/1977 |
| JP | 53143221 U1 | 11/1978 |
| JP | 1111877 U1 | 7/1989 |
| JP | 3124080 U | 12/1991 |
| JP | 7224633 A | 8/1995 |
| JP | 8210532 A | 8/1996 |
| JP | 112338 A | 1/1999 |

\* cited by examiner

DEVICE FOR CONTROLLING OR REGULATING THE THROUGH-FLOW AMOUNT AND/OR THROUGH-FLOW DIRECTION OF FLUIDS

CROSS-REFERENCE TO RELATED APPLICATIONS

This application is the United States national phase of International Application No. PCT/EP2015/056998 filed Mar. 31, 2015, and claims priority to German Patent Application No. 10 2014 106 010.5 filed Apr. 29, 2014, the disclosures of which are hereby incorporated in their entirety by reference.

BACKGROUND OF THE INVENTION

Field of the Invention

The invention relates to a device for controlling or regulating the through-flow amount and/or through-flow direction of fluids, comprising: a housing with at least two inlets and/or outlets, at least one arm which is movably arranged within the housing, and at least one closure element which is arranged within the housing and is movably connected with the arm, wherein the arm and the closure element connected therewith are arranged and connected with one another such that at least one inlet and/or outlet is able to be closed off by the closure element, and wherein the closure element and/or at least one inlet and/or outlet has a curved sealing surface for sealing the inlets and/or outlets.

The invention relates in addition to the use of such a device in the sterilisation of food packagings and/or the filling material thereof.

Description of Related Art

Flowing fluids—i.e. gases or liquids—can be influenced in various ways. The aim of this influence can lie for example in a controlling or regulating of the through-flow amount or the through-flow direction of the fluids. For this, numerous devices are known from the prior art, which are frequently designated as valves. A group of valves are constituted by directional valves or multi-way valves, which are distinguished in that they have three or more fluid connections and are switchable. In this way, for example, an inlet can be connected according to the requirements with a first outlet or with a second outlet and thereby the flow can be directed in different directions. In addition, both outlets can be closed, so that the flow is completely interrupted. In addition to the completely open and the completely closed position, intermediate positions can also be adopted for adjusting the through-flow amount, in which the outlets are only partially opened.

A particular challenge in valves traditionally lies in being able to close off the outlets particularly reliably in order to completely prevent the fluid flow. For this, it is necessary to produce a line or surface contact between two components which are movable relative to one another, which reliably interrupts the fluid flow. These components can concern, for example, a closure element which can be pressed onto a valve seat and can be lifted off from the valve seat again.

In order to achieve a particularly well sealing connection between closure element and valve seat, sealing surfaces made of rubber are known, which are provided on the closure element or on the valve seat. By the rubber, unevennesses on the contact surfaces can be balanced out, so that a particularly good seal is achieved. Nevertheless, sealing surfaces made of rubber are not able to be used in several applications. For example, sealing surfaces made of rubber can be damaged at very high pressures or very high temperatures. In addition, sealing surfaces made of rubber do not fulfil the strict hygiene requirements which are placed for example on the facilities which are used in the filling of foodstuffs.

For this reason, in particular in the case of high hygiene requirements, valves with metallic sealing surfaces are preferred, because these can be cleaned particularly well and have a higher resistance with respect to cleaning agents, sterilisation agents and the foodstuffs which are to be filled. A challenge in the case of closure elements with metallic sealing surfaces, however, lies in achieving a reliable seal. This is because owing to the very high rigidity and the very low elasticity connected therewith, metallic sealing surfaces can scarcely adapt to the surfaces of the valve seats associated with them and therefore also compensate only to a very limited extent the manufacturing tolerances or alignment errors which are inevitably present. In addition to manufacturing tolerances, also slight deformations within the valve are to be compensated, which occur for example due to very high mechanical or thermal stresses. In order to counteract these problems, it was already proposed to use valves in which the closure elements indeed have metallic sealing surfaces, but the closure elements are mounted pivotably within the valve.

Such a three-way valve is known for example from JP 7-224633 A (also illustrated in FIG. 6 of U.S. Pat. No. 5,908,047 as prior art). This concerns a valve for the exhaust system of an internal combustion engine. The valve comprises a housing with one inlet and two outlets. In the housing, a pivotably mounted arm is situated, at the end of which two closure elements with spherical sealing surfaces are fastened. According to the position of the arm, the first closure element closes the first outlet or the second closure element closes the second outlet. The fastening of the closure elements on the arm takes place via a pivot joint, so that the closure elements can be pivoted about a small angle with respect to the arm.

A disadvantage in the valve known from JP 7-224633 lies in that the pivot joint, which connects the closure elements with the arm, only has one degree of freedom of movement; the pivot joint therefore only permits a pivoting of the closure elements about a fixed rotation axis. This restricted mobility is in fact to be counteracted according to the teaching of JP 7-224633 A in that the arm is connected with the housing by a rotational sliding joint and therefore can not only be pivoted, but also moved vertically. However, this structural provision also can not completely compensate the described disadvantages, because despite the vertical adjustment, the closure elements continue to be only pivoted about one axis; a pivoting about a second axis standing perpendicularly on the first axis, on the other hand, is not provided, so that no possibility exists for being able to compensate so-called "angle errors". In addition, the pivot joint does not permit any linear movement, i.e. any alteration of distance between the closure elements and the arm. Finally, the proposed solution has the disadvantage that the joints which are used (pivot joint, rotational sliding joint) do not permit any targeted alignment of the closure elements. In particular, on the pivoting around of the arm, the risk exists that the closure elements under the influence of the weight force and/or of the fluid flow are brought into an undesired position, which makes difficult the subsequent placing of the closure elements onto other outlets which are to be sealed.

Against this background, the invention is based on the problem of configuring and further developing the device mentioned in the introduction and previously presented in further detail such that a high degree of mobility of the closure element is achieved in the stressed state with, at the same time, defined alignment of the closure element in the relieved state.

SUMMARY OF THE INVENTION

This object is achieved in a device according to the introductory clause of claim 1 by a pre-stressed spring element which is arranged between the arm and the closure element.

The device according to the invention is distinguished firstly by a housing which has at least two inlets and/or outlets. A fluid can flow into the housing through the inlets and it can flow out from the housing again through the outlets. The inlets and outlets can also be designated generally as "connections", so that a housing with at least two connections is concerned. A device with two connections—for example one inlet and one outlet—can be used as a simple shut-off valve. On the other hand, a device with at least three connections—for example one inlet and two outlets—can be used as a switchable multi-way valve. For this reason, devices are preferred which have at least three inlets and/or outlets. Preferably, the housing is produced from metal, in particular from high-grade steel. Furthermore, at least one arm is provided, which is arranged movably within the housing and in particular can be connected movably with the housing. The arm can be connected directly or indirectly, i.e. via further components, with the housing. The arm is also preferably produced from metal, in particular from high-grade steel. In addition, at least one closure element is provided, which is arranged within the housing and is connected movably with the arm. The connection between the closure element and the arm can also take place directly or indirectly, for example via a joint. For the production of the closure element, likewise metal, in particular high-grade steel, is preferably used. Provision is made that the arm and the closure element connected therewith are arranged and connected with one another such that at least one inlet and/or outlet is able to be closed off by the closure element. This requirement is achieved through a corresponding dimensioning, arrangement and connection of the individual components. In order to achieve a self-centering of the closure element on introduction into the inlet or respectively outlet which is to be closed off, provision is made, finally, that the closure element and/or at least one inlet and/or outlet—in particular the inlet or respectively outlet which is to be closed off by this closure element—has a curved sealing surface for the sealing of the inlets and/or outlets.

Several advantages are achieved by it being proposed according to the invention that a pre-stressed spring element is arranged between the arm and the closure element: Firstly, the spring element, owing to its pre-stressing, enables an alignment and centering of the movably mounted closure element in a defined "required position". The closure element only leaves this initial position under deformation of the spring elements, which requires a particular application of force. As soon as the force acting on the closure element becomes less, the spring element assumes its original position again and guides the closure element back again into its initial position. Through the described alignment of the closure element, quicker and more precise switching operations can be achieved. This is because, owing to the automatic alignment, the danger does not exist that the closure element is brought into an undesired position in the switchover phase under the effect of the weight force and/or the fluid flow, which makes difficult the subsequent placing of the closure element onto the inlet or respectively outlet which is to be sealed. Nevertheless in any case with sufficiently high application of force—such as occurs for example on pressing the closure element onto the inlet or respectively outlet which is to be sealed—a high degree of mobility of the closure element is maintained, which permits an optimum compensation of geometric tolerances.

A further advantage of the pre-stressed spring elements lies in that—with corresponding mounting of the closure element—the function of a safety valve or pressure relief valve can be guaranteed. This is because on exceeding a permissible response pressure in the inlet or respectively outlet which is to be sealed, the spring elements permit a slight opening of the closure element, whereby fluid is discharged from the inlet or respectively outlet which is to be sealed, and the pressure prevailing there is reduced. In this way, the installations connected to the device can be protected from an unacceptable rise in pressure and a damage which is thereby entailed. As soon as a particular pressure level is fallen below again, the spring element presses the closure element securely again onto the inlet or respectively outlet which is to be sealed, and seals the latter. Preferably, the spring element is only mounted or clamped (force-fitting connection) between the arm and the closure element without being welded to one of these components. This has the advantage that the spring element can slide on the arm and/or on the closure element. Alternatively hereto, the spring element can be welded to one of the two adjacent components (substance-to-substance connection) and can slide on the respectively other of the two adjacent components. Through a ring-shaped construction of the spring element, the spring element can be guided, for example, around a narrow site of the closure element, so that even without weldings a captive mounting (form-fitting connection) is guaranteed. With a ring-shaped construction of the spring element, preferably several radially outwardly directed wings are provided on the spring element. The spring element is also preferably produced from metal, in particular from high-grade steel. Alternatively to being produced from metal, some or all parts of the device can also be produced by particular plastics, which fulfil the hygiene requirements of the food industry (e.g. PEEK=polyetheretherketone).

An embodiment of the invention makes provision that the arm has at least one through-hole, through which two closure elements, which are arranged on opposite sides of the arm, are connected with one another. By a through-hole or a through-bore being provided in the arm, a particularly simple and reliable connection can be produced between the closure element and the arm: Two closure elements, arranged lying opposite, are connected with one another through the through-hole provided in the arm, whereby at the same time a connection of the two closure elements with the arm is achieved. For maintenance reasons, a detachable connection is preferred; the two opposite closure elements can be screwed to one another, for example. For this, an internal thread can be provided in both closure elements, so that both closure elements can be held together by a threaded pin with an external thread. For the formation of the connection, the threaded pin is screwed into one of the two closure elements and the spring element is put in place. This closure element can then be inserted with the threaded pin ahead through the through-hole of the arm. From the other side, finally, a spring element can likewise be put in place and the second closure element can be screwed onto the threaded pin, so that both closure elements are securely connected with one another. Provision can be made that the joint gap occurring between the two closure elements is provided with a seal and/or is glued. The through-hole can have a circular cross-section or another suitable shape (e.g. "elongated hole", "clover-leaf", "oval").

With regard to this embodiment of the invention, it is further proposed that the through-hole has a diameter which is greater than the minimum diameter which the two closure elements have which are connected with one another. Preferably, the two closure elements have their smallest diameter at the site which is associated with the respectively other closure element. In addition, the smallest diameter in both closure elements is preferably of equal size, so that on joining together of the two closure elements, the minimum diameter occurs in the region of the contact surfaces of the two closure elements. By the minimum diameter being smaller than the diameter of the through-hole, no press fit occurs, but rather a clearance fit. This has the result that the two closure elements which are connected to one another are mounted movably relative to the arm. In particular, the closure elements can carry out both a linear movement and also a pivoting movement relative to the arm, so that a particularly flexible mobility is achieved. Through the prestressed spring element which has already been previously described, it is nevertheless achieved that the two closure elements in the relieved state do not slip to and fro in an uncontrolled manner in the through-hole, but rather assume a defined initial position. The minimum diameter of the closure elements can lie in the range between 5 mm and 40 mm; the diameter of the through-hole can lie in the range between 6 mm and 45 mm. In so far as the through-hole does not have a circular cross-section, the diameter of the through-hole designates the minimum width of its opening at the site at which the closure elements are guided through the through-hole.

With regard to these two embodiments, provision is made furthermore that the through-hole has a diameter which is smaller than the maximum diameter which the two closure elements have which are connected with one another. By the maximum diameters of the two closure elements being configured greater than the diameter of the through-hole, it is achieved that the two closure elements which are connected with one another can not slip out from the through-hole and are therefore connected with the arm in a captive manner. The maximum diameter of the closure elements can lie in the range between 30 mm and 300 mm. In so far as the through-hole does not have a circular cross-section, the diameter of the through-hole designates the minimum width of its opening at the site at which the closure elements are guided through the through-hole.

According to a further embodiment of the invention, provision is made that the closure element is connected movably with the arm via a ball joint. Through a ball joint, a mobility of the closure element with three degrees of freedom is achieved, namely a rotation about the axis of symmetry and a pivoting movement about two axes standing perpendicularly on the rotation axis. A mounting by a ball joint has the advantage, compared with the previously described solution, that for the mounting no second closure element, arranged lying opposite, has to be present. This is because the joint head can be provided on the closure element, and the joint socket can be provided on the arm (or vice versa). Flushing grooves can be provided on the joint head and/or on the joint socket, through which a cleaning and or sterilizing medium can be directed. The mounting by ball joints therefore presents itself in particular in the case of closure elements which are not mounted in pairs lying opposite the arm, but rather are connected individually with the arm. Also, a ball joint can be supplemented in an ideal manner by the previously described spring element, so that the closure element, in the relieved state, is always returned into a defined initial position. The lack of possibility of a linear movement of ball joints can be compensated for example by a corresponding mounting of the arm.

A further teaching of the invention proposes that the arm is pivotable about a rotation axis which has a fixed position relative to the housing. A rotation axis with a fixed position has the advantage that in the housing—and if applicable in the housing cover—fixed bearing points for the rotation axis can be provided. This is able to be produced substantially more simply compared with a rotation axis with changeable position, and has, in addition, hygienic advantages. Nevertheless, through a fixed rotation axis with corresponding arrangement of the rotation axis and of the inlets or respectively outlets in the housing it can also be achieved that through the closure elements of one arm several different inlets or respectively outlets are able to be attained through the closure elements of this arm and are therefore able to be closed. In so far as several arms are present, provision can be made that each arm is pivotable about a rotation axis, which has a fixed position relative to the housing.

In further embodiment of the invention, provision is made that the closure element and/or at least one inlet and/or outlet has a sealing surface which is curved in a convex manner. Through a convex, i.e. outwardly curved, sealing surface, it is achieved that the sealing surfaces can reach in a particularly reliable manner the surfaces on the valve seats which are associated with them. In addition, through convex sealing surfaces a line contact with the circumferential edges on the valve seats can be achieved even when chamfers are present on these edges. This enables a reliable sealing of the inlets or respectively outlets. In so far as several closure elements are present, provision can be made that each closure element has a sealing surface which is curved in a convex manner. The same advantages result if the sealing surface which is curved in a convex manner is not present on the closure element, but on the inlet or respectively outlet which is to be sealed.

According to a further embodiment of the invention, it is proposed that the closure element and/or at least one inlet and/or outlet has a spherical sealing surface. The sealing surfaces do not imperatively have to be completely spherical or even have the form of a full sphere; instead, it is sufficient if the sealing surfaces are constructed so as to be spherical in the region which can come in contact with the valve seats. A spherical sealing surface has the advantage that the closure elements also achieve an optimum sealing in an inclined or pivoted position, because the cross-sectional area of a sphere—and therefore also the shape of the contact line between closure element and valve seat—never changes, but rather is always circular. In the case of a cone(shell)-shaped sealing surface, the cross-sectional areas with an inclined closure element would, on the other hand, be elliptical. In so far as several closure elements are present, provision can be made that each closure element has a spherical sealing surface. The same advantages arise when the spherically curved sealing surface is not present on the closure element, but on the inlet or respectively outlet which is to be sealed.

A further embodiment of the invention makes provision that the inlets and/or outlets are constructed in a circular shape at their end arranged in the housing. Circular ends of the inlets or respectively outlets have the advantage, owing to their symmetry, that correspondingly shaped closure elements can reliably seal the inlets or respectively outlets also in a position which is twisted with respect to the initial position. The use of inlets or respectively outlets with a circular end is particularly advantageous in closure elements with spherical sealing surfaces. This is because any arbitrary section plane of a sphere is circular, so that a closure element with spherical sealing surfaces can achieve a reliable sealing of an inlet or respectively outlet with a circular end not only in a twisted position, but even in a pivoted position. Circular inlets or respectively outlets can be produced very simply, by tubes with a cylindrical cross-section being cut off straight—i.e. at right-angles to their longitudinal axis.

According to a further teaching of the invention, provision is made that the arm comprises at least two parts which are connected movably with one another, wherein the first part is pivotable about a rotation axis which has a fixed position relative to the housing, and wherein the second part and each further part is pivotable about at least one rotation axis which has a fixed position relative to the adjacent part. By multi-part or respectively multi-membered arms, the closure elements fastened on the arms can be moved in a particularly variable manner, so that with such arms, with an identical number of closure elements compared with one-part arms, frequently an increased number of switch positions can be achieved. Preferably, the different parts of the arms are connected with one another by joints, in particular by pivot joints. In so far as several arms are present, provision can be made that each arm is configured having several parts in the manner previously described.

With regard to this teaching, it is further proposed that at least one closure element is movably connected with the first part of the arm and/or that at least one closure element is movably connected with the second part and/or with every further part of the arm. By the closure elements being able to be fastened to any arbitrary part of the arm, the variability of the movement and therefore the number of the switch positions which are able to be carried out is further increased. The arm can be used particularly variably when closure elements are fastened not only on one, but on several parts of the arm. Two or more closure elements can also be fastened on the same part of the arm, wherein the previously described opposite arrangement of respectively two closure elements is preferred owing to the fastening possibility by means of a through-hole. In so far as several arms are present, provision can be made that each arm is configured in the previously described manner.

A further embodiment of the invention is characterized by an actuator for the movement of the arm, wherein the actuator is arranged outside the housing. Through an actuator, to some extent also designated an actor, a movement, in particular a rotary movement, of the arm can be achieved in a simple manner. For this, both pneumatic and also hydraulic or electric actuators come into consideration. The arrangement outside the housing has the advantage that the actuator can be easily exchanged and that the actuator does not affect the fluid flowing through the housing or contaminate it—for instance by oil or grease. In so far as several arms are present, provision can be made that each arm is moved by an actuator. In this case, each arm can have its own actuator associated with it, or several arms can be moved by the same actuator—for example via a suitable mechanism.

With regard to this embodiment, it is proposed that the actuator is connected mechanically with the arm. A mechanical connection has the advantage of a particularly reliable and precise force transmission. The connection can be realized for example in that a sealed feed-through for the arm or the actuator or a connecting element is provided in the housing.

Alternatively hereto, it is proposed with regard to this embodiment that the actuator is coupled in a contact-free manner, in particular magnetically, with the arm. Through a contact-free connection, in particular a "magnetic coupling", a feed-through of mechanical components through the housing can be dispensed with and therefore a good sealing can be ensured even at high pressures and in the case of fluids which are difficult to seal (e.g. gases).

In further embodiments of the invention, provision is made that several arms are movably connected with the housing via a shared linear guide or via respectively a separate linear guide. Preferably, the shared linear guide is arranged centrally in the housing and is rigidly connected with the housing, whereas the arms are movably connected with the shared linear guide. The mounting of several arms through a shared linear guide has the advantage that only one connection with the housing has to be provided. The use of several separate linear guides, on the other hand, has the advantage that each of the bearings can be arranged particularly tightly against the inlet or respectively outlet—i.e. externally—which is to be sealed and therefore can guide the arm particularly precisely. Through the possibility of a linear mobility of the arms, in addition a particularly uniform control of the through-flow amount becomes possible, because the gap which forms between the closure element and the inlet or respectively outlet which is to be sealed is of equal size at every location. Preferably, the arms are displaceable in radial direction relative to the shared linear guide or to the separate linear guides. The radial displaceability can be achieved for example in that in the linear guides radial bores are provided, in which the arms are movably guided. The bores can comprise flushing grooves running in longitudinal direction, through which fluids for sterilisation can be directed.

This construction of the device can be supplemented by at least one adjusting disc, rotatably connected with the housing, with at least one outwardly or inwardly directed contour for the radial displacement of the arms. Through a rotatably mounted adjusting disc, the linear movement of the arms can be coupled to the rotational movement of the adjusting disc. This can be implemented for example in that a wheel is fastened on each arm, which on a rotation of the adjusting disc rolls or slides on the contour thereof and in so doing presses the arm and the closure element fastened thereon in radial direction against a spring pressure inwards or respectively outwards or as a result of the spring pressure allows it to come outwards or respectively inwards in radial direction again. In order to achieve this, the contour of the adjusting disc is preferably shaped such that in its course it alters its radial distance to the rotation axis of the adjusting disc. Alternatively or additionally to this, the arms can also be moved by the fluid flowing through the device, or another fluid. Detent points can be provided on the contour of the adjusting disc, which constitute a defined position for the wheels.

The contour of the adjusting disc can be shaped such that on a rotation of the adjusting disc all the arms which are to be moved by the adjusting disc move synchronously. This is the case for example—with symmetrical arrangement of the inlets or respectively outlets which are to be sealed—when the contour of the adjusting disc is also shaped symmetrically. Alternatively hereto, the contour of the adjusting disc can be shaped such that on a rotation of the adjusting disc no synchronous movement takes place of the arms which are to be moved. Through such a configuration it can be achieved, for example, that firstly a first inlet is opened, in order to flush the housing with a first fluid, before a second inlet is opened, in order to flow through the housing with a second fluid.

Two or more adjusting discs can be provided. In this case, the adjusting discs are preferably mounted in the housing so as to be displaceable in the direction of their rotation axis and have differently shaped contours. This has the advantage that a "switchover" can be carried out between the different adjusting discs, in order to achieve different movement sequences of the arms and therefore different switch positions. In other words, the adjusting discs can be arranged like gear rings in a gear cluster or respectively sprocket cluster of a bicycle.

A further advantage of several adjusting discs lies in that some (or all) of the adjusting discs can be associated with only some arms. This can be achieved for example in that the wheels of the arms, rolling or sliding on the contours of the adjusting discs, are arranged in different planes, which correspond to the planes of the adjusting discs acting on them.

Alternatively or additionally, provision can be made that some (or all) of the adjusting discs are not able to fully revolve, but rather are rotatable only about a limited angle range, and therefore only arms arranged within this angle range can respond. This has the advantage that several adjusting discs—for example shaped like a sector of a circle—can be arranged adjacent to one another, without colliding.

With the use of several adjusting discs, furthermore, provision can be made that some (or all) of the adjusting discs are driven by separate drives. This has the advantage that the adjusting discs—and the arms moved by them—can be activated individually, whereby a particularly variable control of the through-flow amounts and through-flow directions is possible. Alternatively hereto, a shared drive can be provided for all adjusting discs, which is able to be realized structurally in a particularly simple manner.

Finally, provision can be made that one (or all) of the adjusting discs have two or more contours. In this case, the contours of the same adjusting disc are preferably shaped differently. Two contours can be provided, of which one contour is directed inward and the other contour is directed outward. This makes it possible that the wheels (or other guide elements), fastened to the arms, slide on both sides on the two correspondingly shaped contours and therefore can be positively guided radially inward and radially outward by the same adjusting disc.

A particularly advantageous use of the previously described device in all described embodiments lies in the sterilisation of food packagings. The suitability of the device for this purpose lies firstly in that a reliable sealing of the inlets or respectively outlets is made possible, and that several switch positions are possible, whereby a switchover can be carried out between several fluids used in the sterilisation of food packagings (e.g. sterile air, water vapour, hydrogen peroxide, acid, lye, cleaning medium, condensate, nitrogen, carbon dioxide or foodstuffs which are to be filled). A particular suitability results in addition from the fact that the closure elements which do not seal an inlet or respectively outlet in the set switch position, owing to their permanent arrangement within the housing are inevitably flowed around by the fluid which is used for the sterilisation of the food packagings, so that these closure elements and in particular their spring elements are inevitably likewise cleaned and sterilised. The suitability for the said purpose also results from the fact that all the parts of the device can be produced from materials which fulfil the highest hygiene requirements (e.g. high-grade steel) and that the device can be operated free of lubricant.

BRIEF DESCRIPTION OF THE DRAWINGS

The invention is explained in further detail below by means of a drawing illustrating merely a preferred example embodiment. In the drawing there are shown.

DESCRIPTION OF THE INVENTION

Figure 1A:
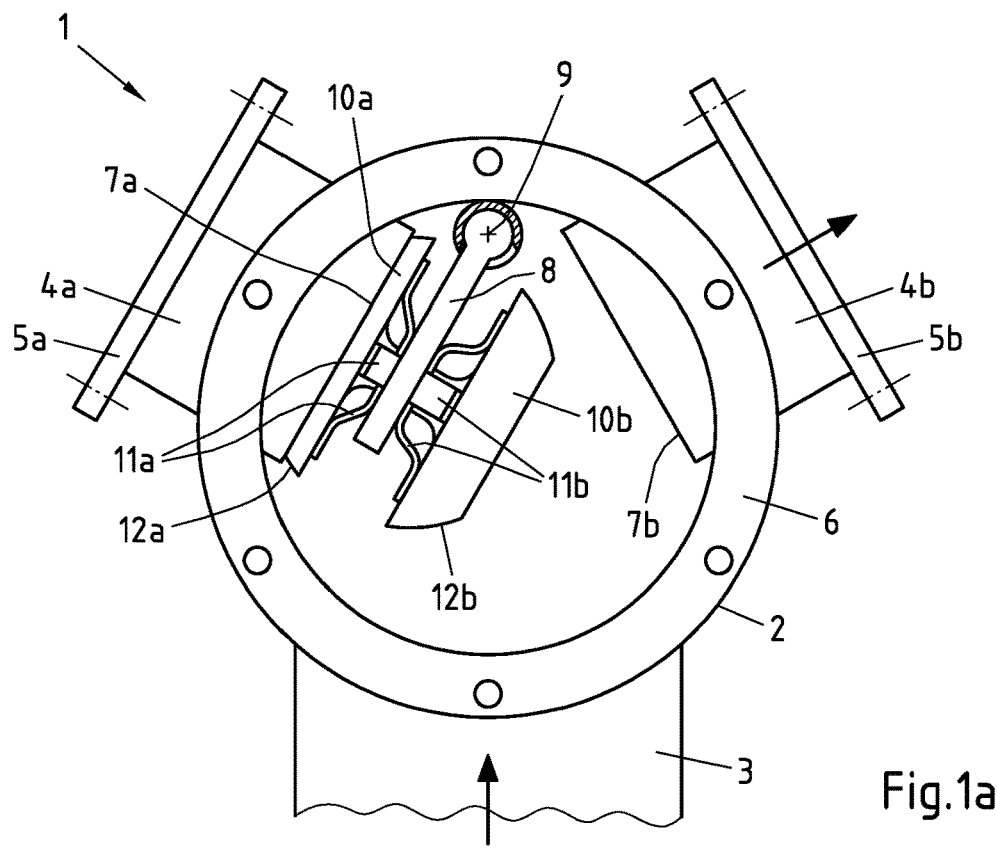
FIG. 1a a first embodiment of a device according to the invention in a first switch position, in top view, FIG. 1b the device of FIG. 1a in a second switch position, FIG. 1c the arm with the two closure elements and with an outlet of the device of FIG. 1a/FIG. 1b, in opened switch position, FIG. 1d the arm with the two closure elements and with an outlet of the device of FIG. 1a/FIG. 1b in closed switch position, FIG. 2a a second embodiment of a device according to the invention, in top view, FIG. 2b the device of FIG. 2a with an altered arm, FIG. 3 a third embodiment of a device according to the invention, in top view, FIG. 4 a fourth embodiment of a device according to the invention, in top view, FIG. 5a a fifth embodiment of a device according to the invention in a first switch position, in top view, FIG. 5b the device of FIG. 5a in a second switch position, FIG. 6 a sixth embodiment of a device according to the invention, in top view, and FIG. 7 a seventh embodiment of a device according to the invention, in top view.
Figure 1B:
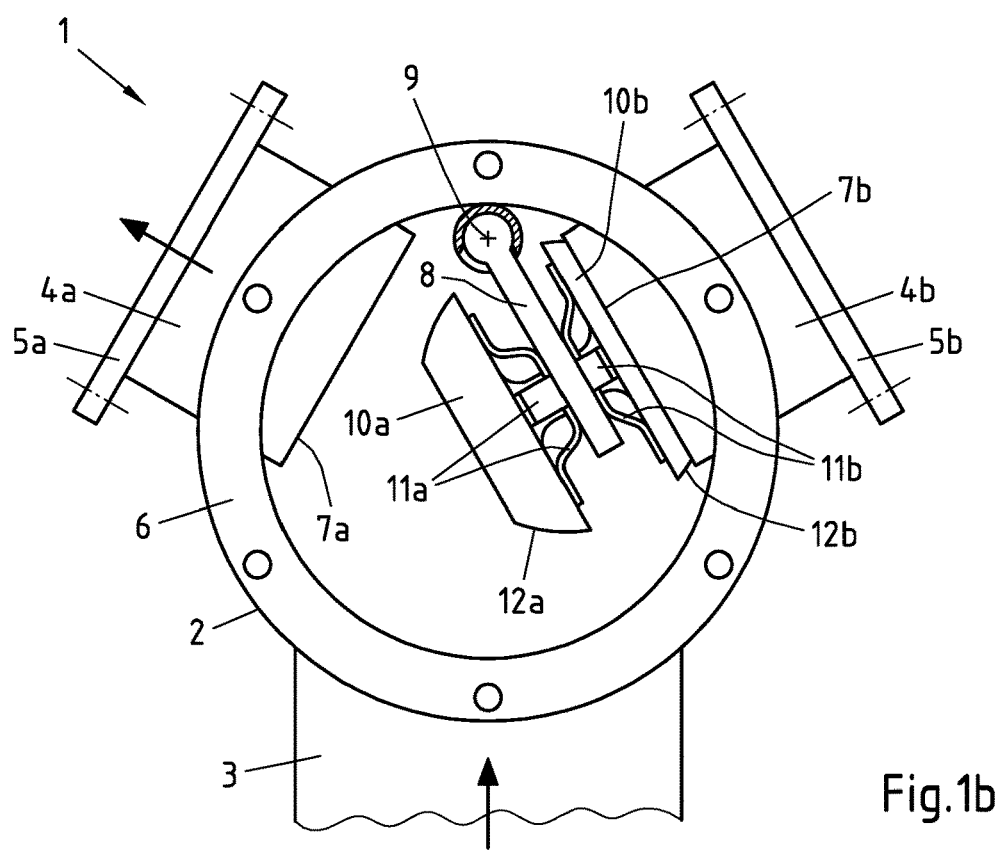

FIG. 1a and FIG. 1b show a first embodiment of a device 1 according to the invention in a first and in a second switch position, in top view. The illustrated device 1 comprises a cylindrical housing 2, which has one inlet 3 and two outlets 4a, 4b. The inlet 3 and the two outlets 4a, 4b are short cylindrical metal tubes, which have respectively a flange 5a, 5b at their ends lying outside the housing 2, to which flange tubes or hoses (not illustrated in FIG. 1a/FIG. 1b) can be connected. The housing 2 has, in addition, a flange 6, onto which a housing cover (not illustrated in FIG. 1a/FIG. 1b) can be placed and screwed to the housing 2. The inlet 3 was connected to the housing 2 such that the end of the inlet 3 is adapted to the cylindrical shape of the housing 2. The inlet 3 accordingly does not project into the housing 2. In contrast, the inlets 4a, 4b project with their ends 7a, 7b into the housing 2. In addition, the cylindrical inlets 4a, 4b are cut off straight—i.e. at right-angles to their longitudinal axis—at their ends 7a, 7b arranged in the housing 2, so that the two outlets 4a, 4b are constructed in a circular shape at their ends 7a, 7b arranged in the housing.

In addition, in the device 1 illustrated in FIG. 1a/FIG. 1b an arm 8 is provided, which is arranged within the housing 2 and is movably connected with the housing 2. The movable mounting of the arm 8 takes place via a rotation axis 9, about which the arm 8 is pivotable. The rotation axis 9 has a fixed position relative to the housing 2, it is for example rotatably mounted by its two ends in the base and in the cover of the housing 2. The arm 8 carries at its end two closure elements 10a, 10b, arranged lying opposite.

Between the arm 8 and the two closure elements 10a, 10b a spring element 11a, 11b made of metal is respectively arranged, which permits a relative movement between the two closure elements 10a, 10b and the arm 8 and guides the two closure elements 10a, 10b back into an initial position in the relieved state. The spring elements 11a, 11b are preferably only clamped between the arm 8 and the two closure elements 10a, 10b. The wings of the spring elements 11a, 11b can therefore slide on the surface of the arm 8 and/or on the surfaces of the closure elements 10a, 10b.

The left closure element 10a is associated with the left outlet 4a and can close the left outlet 4a with a corresponding position of the arm 8 so that the fluid flowing into the housing 2 through the inlet 3 can exit again from the housing 2 through the right, opened outlet 4b. This position is illustrated in FIG. 1 (flow direction indicated by arrows). In contrast, the right closure element 10b is associated with the right outlet 4b and can close the right outlet 4b with a corresponding position of the arm 8, so that the fluid flowing into the housing 3 through the inlet 3 can exit again from the housing 2 through the left, opened outlet 4a. This position is illustrated in FIG. 1b (flow direction indicated by arrows). In order to achieve a particularly reliable sealing of the outlets 4a, 4b, the closure elements 10a, 10b have curved sealing surfaces 12a, 12b, which will be entered into more precisely below in connection with FIG. 1c and FIG. 1d. In addition to the two closed positions shown in FIG. 1a and FIG. 1b, a neutral position of the arm 8 is also possible, in which both outlets 4a, 4b are opened.

Figure 1C:
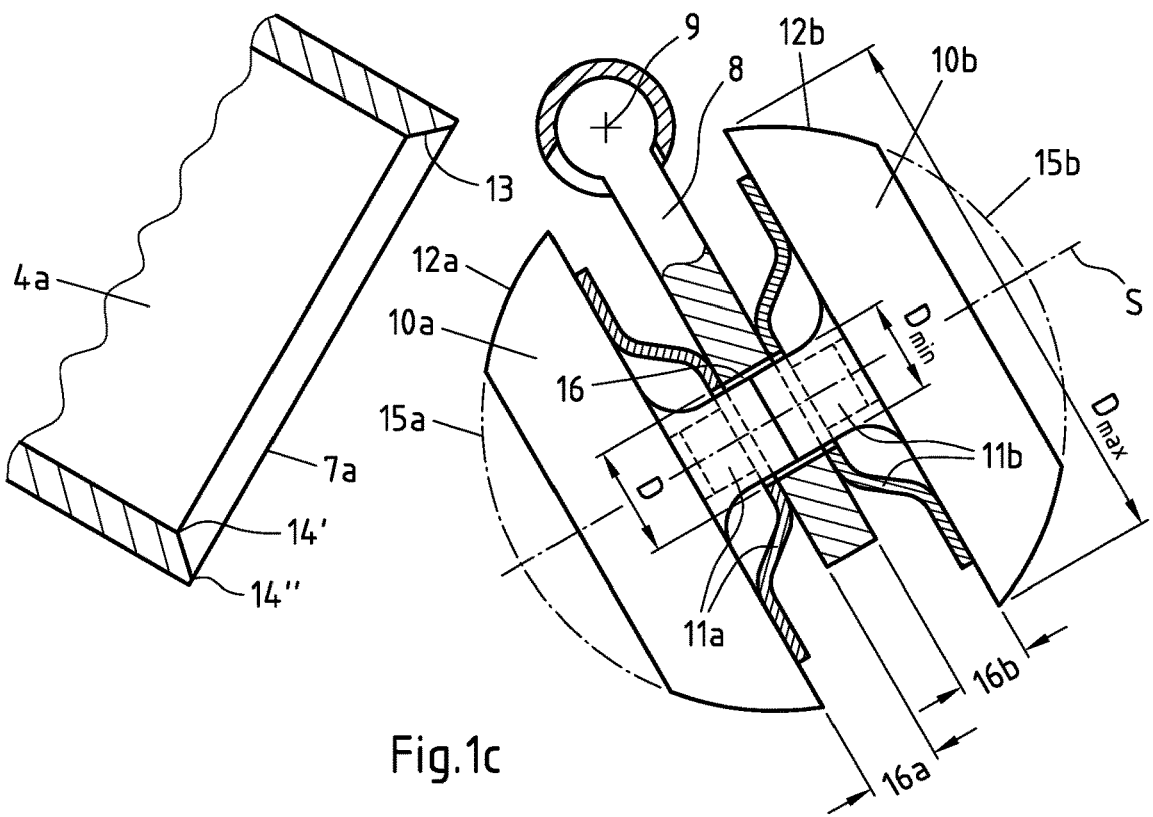
Figure 1D:
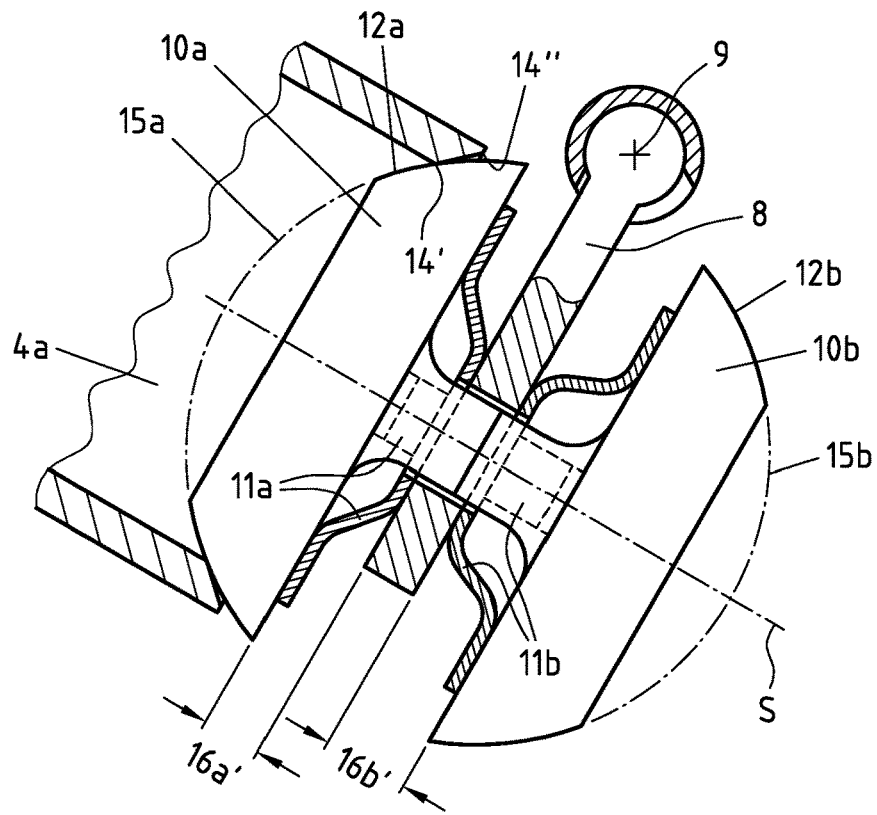

In FIG. 1c and FIG. 1d the arm 8 with the two closure elements 10a, 10b and the one outlet 4a of the device 1 of FIG. 1a/FIG. 1b is illustrated in opened switch position (FIG. 1c) and in closed switch position (FIG. 1d). The regions of the device 1 already described in connection with FIG. 1a or FIG. 1b of the device 1 are given corresponding reference numbers in FIG. 1c and in FIG. 1d.

In FIG. 1c it can be seen on the left that the outlet 4a has a circumferential chamfer 13 in the region of its end 7a. Owing to the chamfer 13, two circumferential edges 14', 14" occur, of which the inner edge 14' is used as a sealing edge. Alternatively to the illustrated variant, the outer edge 14" or another edge arranged between the two edges 14', 14" could equally well be used as sealing edge. In the right-hand region of FIG. 1c it can be seen that both closure elements 10a, 10b are constructed rotationally symmetrically and have an axis of symmetry S, which in the initial position which is shown stands perpendicularly on the arm 8. The sealing surfaces 12a, 12b of the closure elements 10a, 10b are curved outwards in a convex manner and lie respectively completely on a sphere surface 15a, 15b. The sealing surfaces 12a, 12b are therefore curved spherically. The two sphere surfaces 15a, 15b can be part of a shared sphere surface or can span two different sphere surfaces, which are not congruent. The closure elements 10a, 10b do not form a full sphere, because on the one hand the sphere dome is missing in the outer region and on the other hand the closure elements 10a, 10b are constructed to be substantially slimmer in the inner region, in order to be able to arrange the arm 8 and the spring elements 11a, 11b there.

In FIG. 1d the closed switch position is illustrated, in which the arm 8 is pivoted toward the left, so that the closure element 10a is pressed onto the left outlet 4a, in order to close the latter. On compressing, a circumferential line contact occurs between the inner edge 14' of the left outlet 4a and the sealing surface 12a of the closure element 10a. The remaining regions of the outlet 4a, in particular the chamfer 13 with the outer edge 14", on the other hand, have no contact to the sealing surface 12a of the closure element 10a. Through the formation of a line contact between the outlet 4a and the closure element 10a, the contact pressure is concentrated onto a very small area, so that a very high pressure occurs. This leads to a particularly reliable seal.

The two opposite closure elements 10a, 10b are connected with one another, in particular screwed. For this, for example, an internal thread can be provided in both closure elements 10a, 10b, so that both closure elements 10a, 10b can be held together by a threaded pin with an external thread. The connection between the two closure elements 10a, 10b and the arm 8 takes place for example via a through-hole 16, which is provided in the arm 8. For the formation of the connection, for example a threaded pin is screwed into one of the two closure elements 10a and the spring element ha is put in place. This closure element 10a is then inserted with the threaded pin ahead through the through-hole 16 of the arm 8. From the other side, the spring element 11b can then be put in place and the second closure element 10b can be screwed onto the threaded pin, so that both closure elements 10a, 10b are securely connected with one another. Provision can be made that the joint gap occurring between the two closure elements 10a, 10b is provided with a seal and/or glued.

The through-hole 16 has a diameter D which is greater than the minimum diameter $D_{min}$ which the two closure elements 10a, 10b have which are connected with one another. The minimum diameter $D_{min}$ is preferably situated in the region of the separation plane of the two closure elements 10a, 10b which are connected with one another. As the minimum diameter $D_{min}$ is smaller than the diameter D of the through-hole 16, the two closure elements 10a, 10b can be moved very freely and in particular can be displaced both in the direction of the axis of symmetry S and also in any direction with respect to the axis of symmetry S. Diameter D of the through-hole 16 is in fact greater than the minimum diameter $D_{min}$ of the two closure elements 10a, 10b which are connected with one another, but smaller than the maximum diameter $D_{max}$ of the two closure elements 10a, 10b which are connected with one another. By the maximum diameter $D_{max}$ of the two closure elements 10, 10b which are connected with one another being greater than the diameter D of the through-hole 16, it is achieved that the two closure elements 10a, 10b, which are connected with one another can not slip out from the through-hole 16 and therefore are connected in a captive manner and nevertheless movably with the arm 8. Through the pre-stressed spring elements 11a, 11b, which are clamped on both sides between the arm 8 and the two closure elements 10a, 10b which are connected with one another, it is prevented that the closure elements 10a, 10b slip loosely to and fro in the through-hole 16. Through the spring elements 11a, 11b, therefore, an alignment or levelling of the closure elements 10a, 10b in the relieved state is achieved.

In the opened switch position (illustrated in FIG. 1c), the spring elements 11a, 11b are uniformly pre-stressed, wherein a distance 16a occurs between the rear side of the closure element 10a and the arm 8. The same applies for the other side of the arm 8, on which a distance 16b occurs between the rear side of the closure element 10b and the arm 8. With the same pre-stressing of the spring elements 11a, 11b, the distance 16a corresponds to the distance 16b. The pre-stressing of the spring elements 11a, 11b makes provision in addition for a precise, inclination-free alignment of the two closure elements 10a, 10b.

In the closed switch position (illustrated in FIG. 1d) the spring element 11a, on the other hand, is greatly compressed, so that a distance 16a' occurs between the rear side of the closure element 10a and the arm 8, which is smaller than the distance 16a. In a corresponding manner, the opposite spring element 11b is greatly relaxed, so that a distance 16b' occurs between the rear side of the closure element 10b and the arm 8, which is greater than the distance 16b. With a fixed, non-elastic connection of two closure elements 10a, 10b, the difference of the distances 16a and 16a' corresponds to the difference of the distances 16b and 16b'; in this case, both closure elements 10a, 10b are displaced together along their axis of symmetry S. The spring elements 11a, 11b therefore permit a linear movement of the closure elements 10a, 10b in the direction of the axis of symmetry S relative to the arm 8. The stroke of this linear movement can lie in the range between 0.1 mm and 10 mm.

In addition to a linear movement, the spring elements 11a, 11b also permit a pivoting movement (not illustrated in FIG. 1d) of the closure elements 10a, 10b relative to the arm 8. The pivoting movement leads to the symmetry axis S of the closure elements 10a, 10b no longer standing perpendicularly on the arm 8. The extent of the pivoting movement of the closure elements 10a, 10b can lie in the range between ±0.1° and 20° (in both directions).

Alternatively to the illustrated variant, each closure element 10a, 10b can also be connected with the arm 8 via a ball joint (not illustrated), wherein likewise a pre-stressed spring element 11a, 11b is to be arranged between the closure element 10a, 10b and the arm 8, in order to align the closure element 10a, 10b in the relieved state.

The described device 1 belongs to the group of directional valves which are frequently classified according to the number of connections and according to the number of possible switch positions. As in the embodiment of the device 1 shown in FIG. 1a to FIG. 1d a total of 3 connections (one inlet 3 and two outlets 4a, 4b) are present and—apart from the neutral switch position—two switch positions are possible, this is a 3/2-way valve.

Figure 2A:
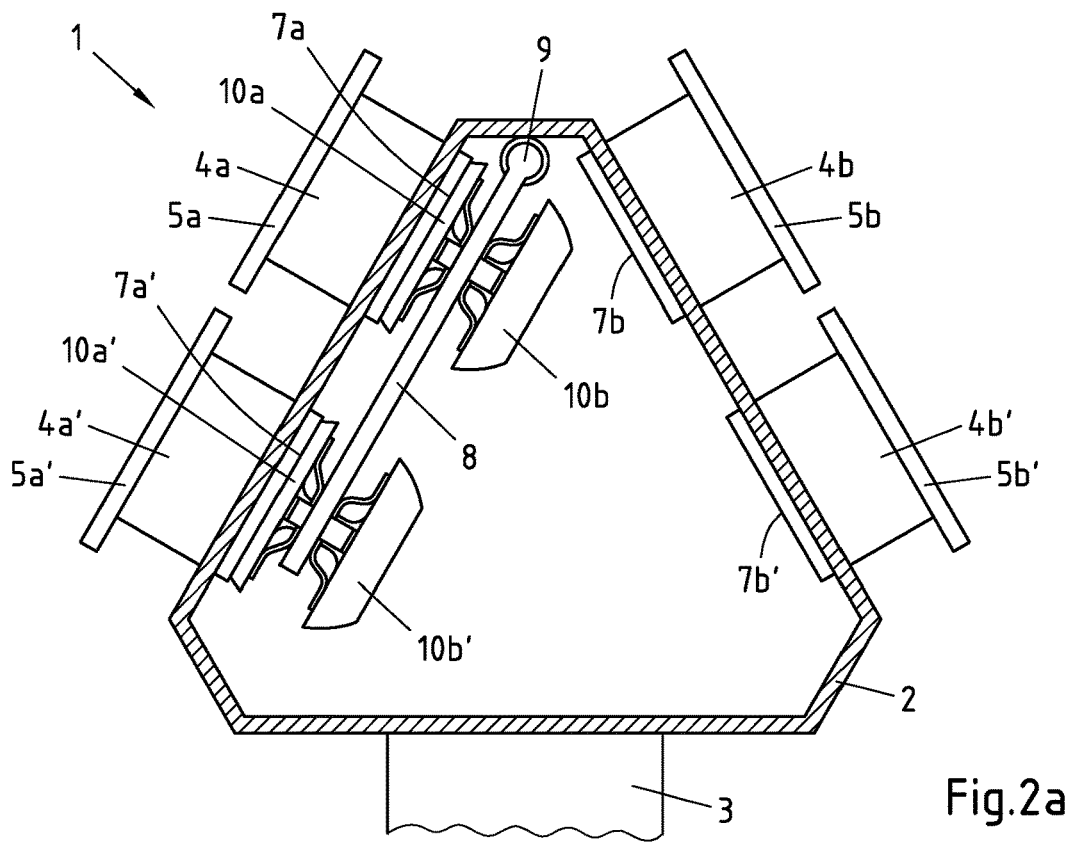

FIG. 2a shows a second embodiment of a device 1 according to the invention, in top view. The regions of the device 1 already described in connection with FIG. 1a to FIG. 1d are provided with corresponding reference numbers in FIG. 2a. The essential difference to the first embodiment (FIG. 1a to FIG. 1d) lies in that in the second embodiment of the device 1 according to the invention, two further outlets 4a', 4b' are provided, so that a total of four outlets 4a, 4a', 4b, 4b' are present. At each outlet 4a, 4a', 4b, 4b' is in turn a flange 5a, 5a', 5b, 5b' for the connecting of hoses and tubes is provided, and an end 7a, 7a', 7b, 7b' projecting into the housing 2. The embodiment of the device 1 illustrated in FIG. 2a has in addition an extended arm 8, on which at total of four closure elements 10a, 10a', 10b, 10b' are fastened in the previously described manner—i.e. via a feed-through of the closure elements 10a, 10a', 10b, 10b' through a through-hole 16 of the arm 8, with simultaneous alignment by pre-stressed spring elements 11a, 11b. The length of the arm 8 and the position of its rotation axis 9, the arrangement of the closure elements 10a, 10a', 10b, 10b' on the arm 8 and the arrangement of the outlets 4a, 4a', 4b, 4b' are coordinated with one another such that with a pivoting of the arm 8 toward the left, the outlets 4a and 4a' are closed by the closure elements 10a and 10a'. With a pivoting of the arm 8 toward the right, on the other hand, the outlets 4b and 4b' are closed by the closure elements 10b and 10b'. In order to enable this arrangement, in this embodiment of the device 1 the housing 2 has an angular shape, wherein respectively two outlets are arranged adjacent to one another in the same lateral face of the housing 2. In addition to these two described positions, a neutral position of the arm 8 is also possible, in which all four outlets 4a, 4a', 4b, 4b' are opened.

As in the embodiment of the device 1 shown in FIG. 2a a total of 5 connections (one inlet 3 and four outlets 4a, 4a', 4b, 4b') are present and—apart from the neutral position—two switch positions are possible, this is a 5-2-way valve.

Figure 2B:
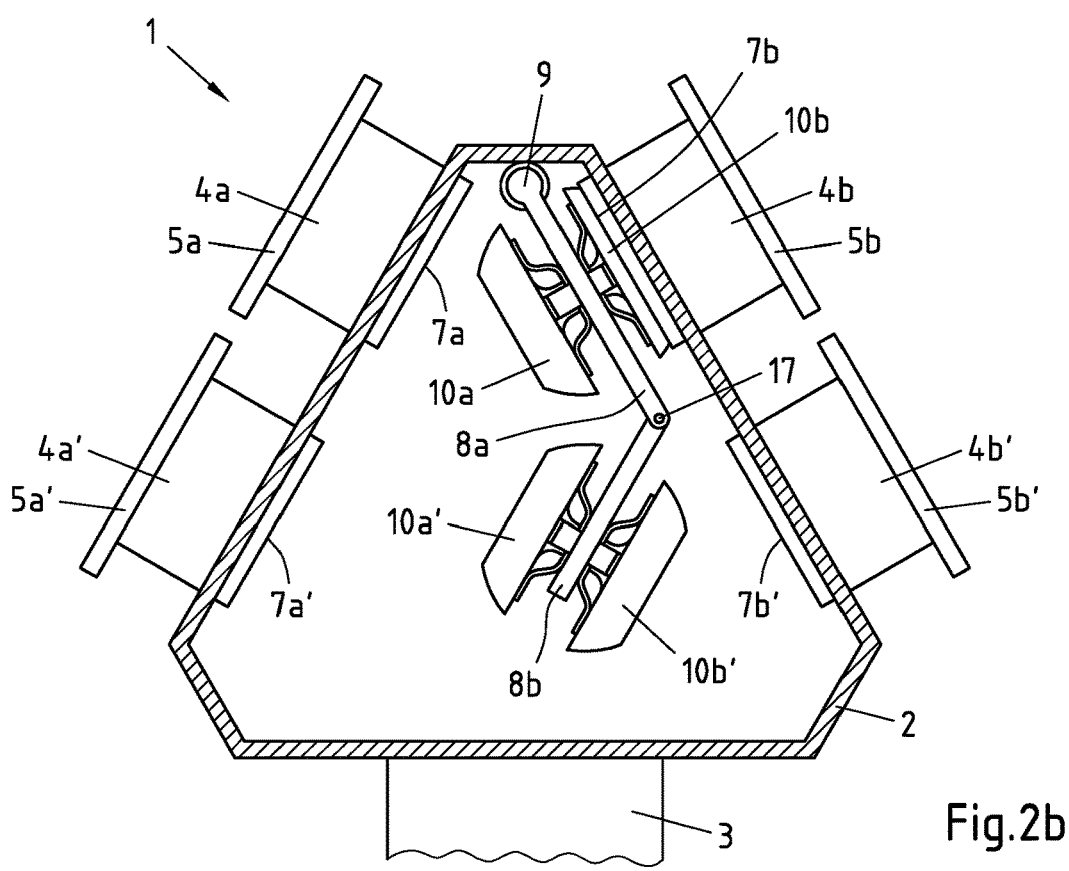

In FIG. 2b the device 1 of FIG. 2a is illustrated with an altered arm 8. The arm 8 comprises two parts 8a, 8b, which are movably connected with one another by a joint 17. The first part 8a of the arm 8 is pivotable about the rotation axis 9 and the second part 8b of the arm 8 is pivotable about the first part 8a of the arm 8 owing to the joint 17. This has the result that the first part 8a of the arm 8 is pivotable about a rotation axis which has a fixed position relative to the housing 2, whereas the second part 8b of the arm 8 is pivotable about a rotation axis running through the joint 17, which rotation axis has a fixed position relative to the first part 8a of the arm 8. Through the altered arm 8, the device 1 illustrated in FIG. 2b can assume four switch positions: With a collinear alignment of the two parts 8a, 8b of the arm 8, two switch positions result, which correspond to the switch positions which were previously described in connection with FIG. 2a; with a bent alignment of the two parts 8a, 8b of the arm 8, on the other hand, two new switch positions result. For example, the closure element 10b can block the outlet 4b, whilst the second part 8b of the arm 8 is pivoted back, so that the closure element 10b' which is fastened thereon leaves the outlet 4b' open (FIG. 2b). In a corresponding manner (not illustrated in FIG. 2b), the closure element 10a can block the outlet 4a, whilst the second part 8b of the arm 8 is pivoted back, so that the closure element 10a' which is fastened thereon leaves the outlet 4a' open. The second part 8b of the arm 8 can be pressed into the bent position for example by a leg spring arranged in or on the arm 8 (not illustrated in FIG. 2b). The straight, collinear alignment of the two parts 8a, 8b of the arm 8 can be achieved by the two parts 8a, 8b of the arm 8 being aligned straight with overcoming of the elastic force by a cable ("Bowden cable") arranged in or on the arm 8 (not illustrated in FIG. 2b). Alternatively to the cable, the two parts 8a, 8b of the arm 8 can also be aligned straight by compressed air or (electro-)magnetic forces. As in the embodiment of the device 1 shown in FIG. 2b a total of 5 connections (one inlet 3 and four outlets 4a, 4a', 4b, 4b') are present and—apart from the neutral switch position—four switch positions are possible, this is a 5/4-way valve.

Figure 3:
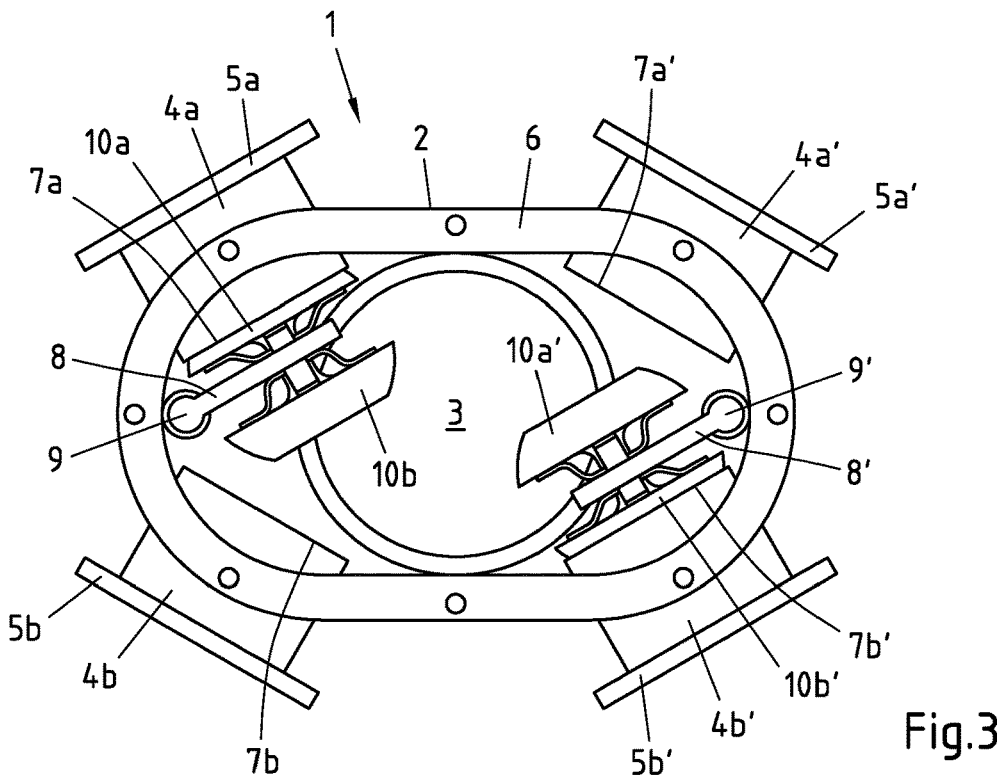

FIG. 3 shows a third embodiment of a device 1 according to the invention, in top view. The regions of the device 1 already described in connection with FIG. 1a to FIG. 2b are given corresponding reference numbers in FIG. 3. The essential difference to the first embodiment (FIG. 1a to FIG. 1d) and the second embodiment (FIG. 2a and FIG. 2b) lies in that in the third embodiment of the device 1 according to the invention, two separate arms 8, 8' are provided, which are pivotable about respectively a rotation axis 9, 9'. The two rotation axes 9, 9' lie at opposite sides of the housing 2 and have a fixed position relative to the housing 2. As in the second embodiment (FIG. 2a and FIG. 2b), a total of four outlets 4a, 4a', 4b, 4b' are also present in the third embodiment of the device 1 according to the invention. Again at each outlet 4a, 4a', 4b, 4b' there is provided a flange 5a, 5a', 5b, 5b' for the connecting of hoses or tubes and an end 7a, 7a', 7b, 7b' projecting into the housing 2. The length of the arm 8 and the position of its rotation axis 9, the arrangement of the closure elements 10a, 10b on the arm 8 and the arrangement of the outlets 4a, 4b are coordinated with one another such that with a pivoting of the arm 8, either the outlet 4a is closed by the closure element 10a or that the outlet 4b is closed by the closure element 10b. The same applies for the length of the arm 8' and the position of its rotation axis 9', the arrangement of the closure elements 10a', 10b' on the arm 8' and the arrangement of the outlets 4a', 4b'. Also in this embodiment of the device 1, neutral positions of the arms 8, 8' are possible, in which all outlets 4a, 4a', 4b, 4b' remain opened. In order to prevent a collision of the two arms 8, 8', the housing 2 in this embodiment of the device 1 has an elongated shape, which comprises two opposite straight lateral faces and two opposite curved lateral faces, wherein the two arms 8, 8' are arranged respectively in the region of a curved lateral face of the housing 2. Also in the third embodiment of the invention, the connection between the closure elements 10a, 10a', 10b, 10b' and the arms 8, 8' takes place in the previously described manner, i.e. via a feed-through of the closure elements 10a, 10a', 10b, 10b' through a through-hole 16 of the arms 8, 8' with simultaneous alignment by pre-stressed spring elements 11a, 11b. As in the embodiment of the device 1 shown in FIG. 3 a total of five connections (one inlet 3 and four outlets 4a, 4a', 4b, 10b') are present and—apart from the neutral switch positions—four switch positions are possible, this is a 5/4-way valve.

Figure 4:
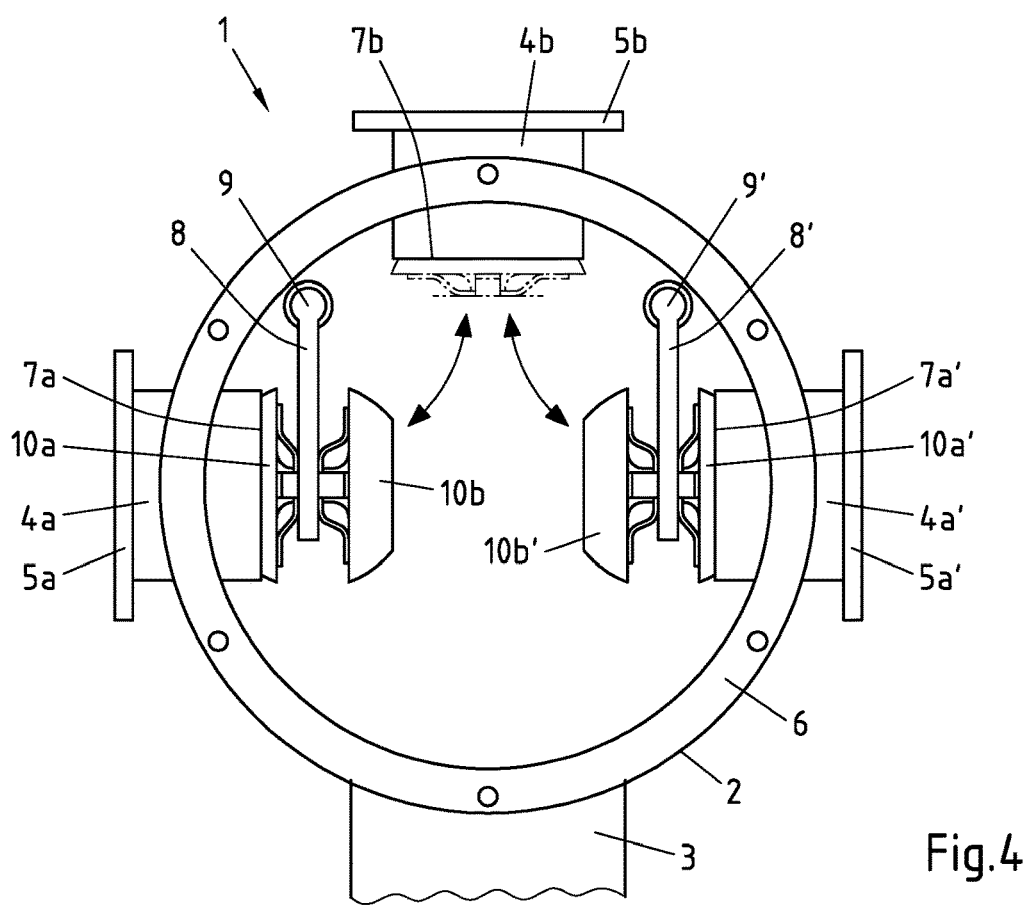

In FIG. 4 a fourth embodiment of a device 1 according to the invention is illustrated, in top view. The regions of the device 1 already described in connection with FIG. 1a to FIG. 3 are given corresponding reference numbers in FIG. 4. The fourth embodiment of the device 1 differs from the previously shown embodiments in particular in that two separate arms 8, 8', but only three outlets 4a, 4a', 4b are present. Both arms 8, 8' are pivotable about respectively a rotation axis 9, 9', which in this embodiment also have a fixed position relative to the housing 2. Again at each outlet 4a, 4a', 4b there is provided a flange 5a, 5a', 5b for the connecting of hoses or tubes, and an end 7a, 7a', 7b projecting into the housing 2. The coordination of the lengths of the arms 8, 8' and the positions of their rotation axes 9, 9', the arrangement of the closure elements 10a, 10a', 10b, 10b' on the arms 8, 8' and the arrangement of the outlets 4a, 4a', 4b, however, has special features in the fourth embodiment: A pivoting of the first arm 8 leads either to the outlet 4a being closed by the closure element 10a or to the outlet 4b being closed by the closure element 10b; a pivoting of the second arm 8' leads either to the outlet 4a' being closed by the closure element 10a' or to the outlet 4b being closed by the closure element 10b'. Whilst the left outlet 4a is associated solely with the first arm 8 and the right outlet 4a' is associated solely with the second arm 8', the upper outlet 4b is associated with both arms 8, 8' and can be closed alternately by several different closure elements 10b, 10b'. As the upper outlet 4b is associated with both arms 8, 8', basically also a collision can occur. In order to prevent this, both arms 8, 8' can not be pivoted simultaneously in the direction of the upper outlet 4b, whereby a—theoretically conceivable—switch position is not able to be realized. Also in this embodiment of the device 1, in addition to the described positions, neutral positions of the arms 8, 8' are possible, in which all the outlets 4a, 4a', 4b remain opened. In addition, also in the fourth embodiment of the invention the connection between the closure elements 10a, 10', 10b, 10b' and the arms 8, 8' takes place in the previously described manner, i.e. via a feed-through of the closure elements 10a, 10a', 10b, 10b' through a through-hole 16 of the arms 8, 8' with simultaneous alignment by pre-stressed spring elements 11a, 11b. As in the embodiment of the device 1 shown in FIG. 4 a total of 4 connections (one inlet 3 and three outlets 4a, 4a', 4b) are present and—apart from the neutral switch positions—three switch positions are possible, this is a 4/3-way valve.

Figure 5A:
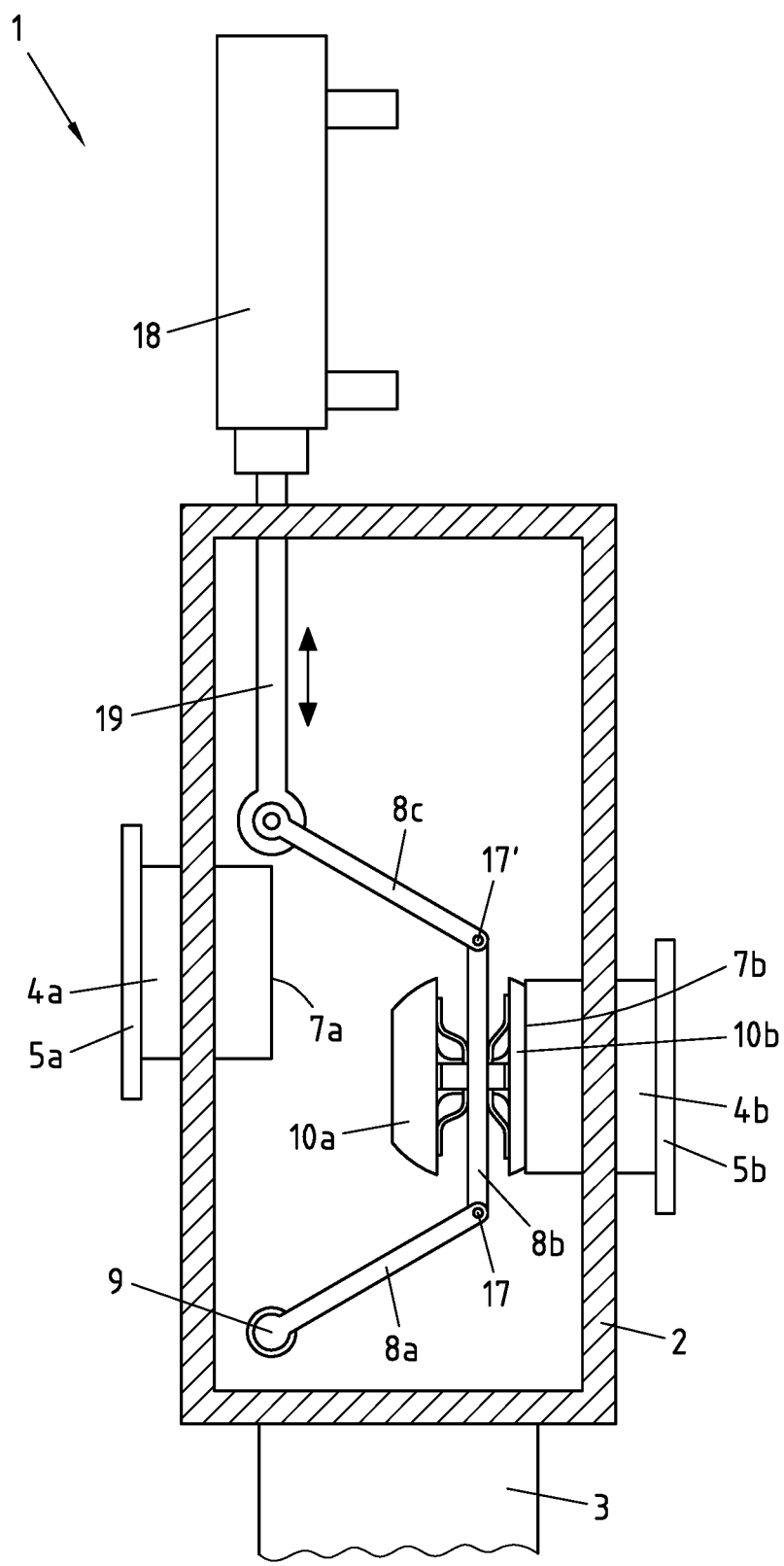
Figure 5B:
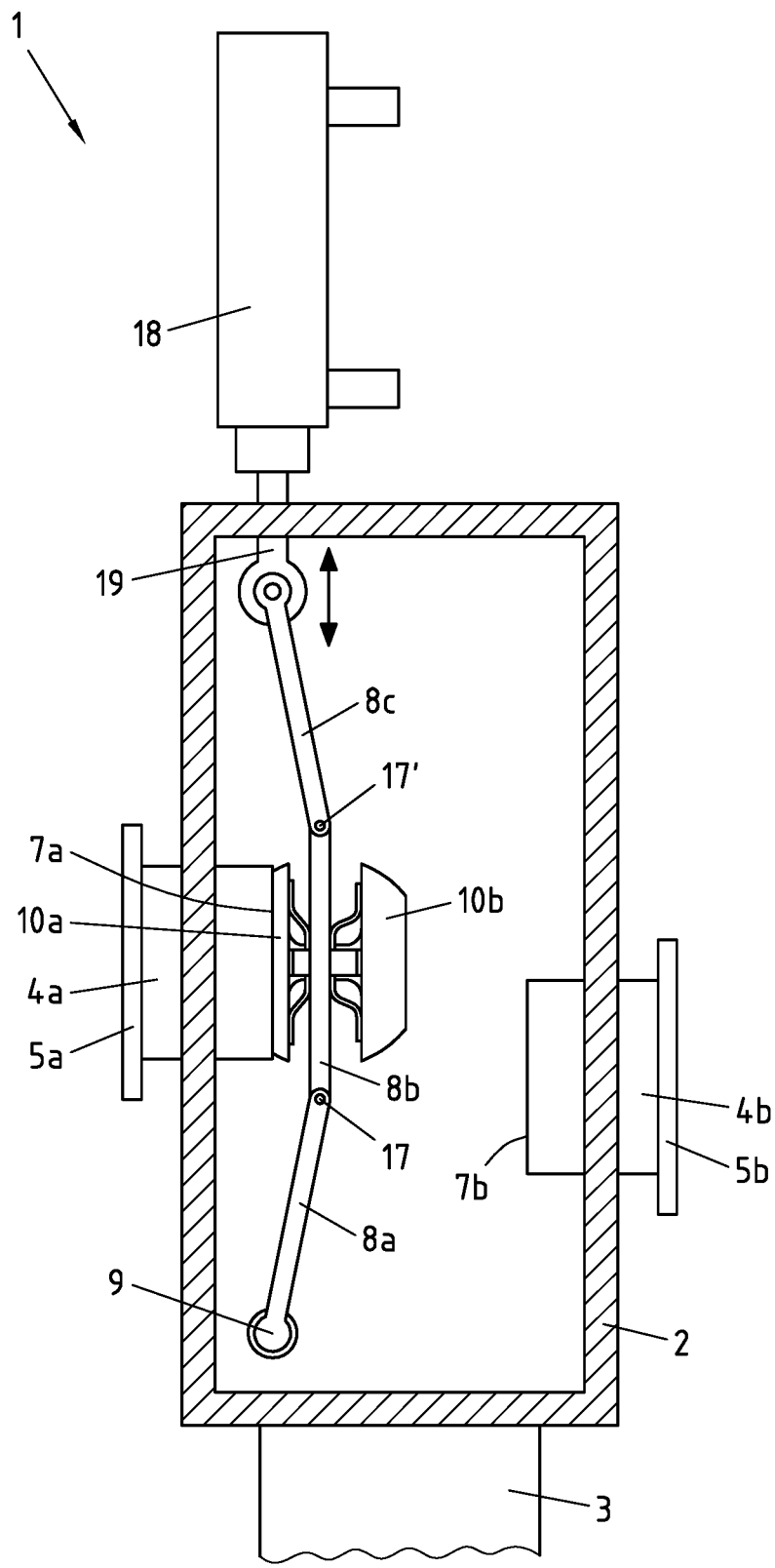

FIG. 5a and FIG. 5b show a fifth embodiment of a device 1 according to the invention in a first switch position (FIG. 5a) and in a second switch position (FIG. 5b), in top view. The regions of the device 1 already described in connection with FIG. 1a to FIG. 4 are given corresponding reference numbers in FIG. 5a and in FIG. 5b. The fifth embodiment of the device 1 differs from the previously shown embodiments in particular in that the longitudinal axes of the two outlets 4a, 4b do not intersect at any point, but rather run offset parallel to one another. This has the result that the two outlets 4a, 4b are not able to be reached by the same one-part pivotable arm. The arm 8 used in the fifth embodiment therefore comprises three parts 8a, 8b, 8c, which are movably connected with one another by two joints 17, 17'. The first part 8a of the arm 8 is pivotable about the rotation axis 9 and the second part 8b of the arm 8 is pivotable about the first part 8a of the arm 8 owing to the joint 17. The third part 8c of the arm 8, finally, is pivotable about the second part 8b of the arm 8 owing to the joint 17'. This has the result that the first part 8a of the arm 8 is pivotable about a rotation axis 9, which has a fixed position relative to the housing 2, whilst the second part 8b and the third part 8c of the arm 8 are pivotable about rotation axes which run through the joints 17, 17' and therefore have a fixed position relative to the first part 8a of the arm 8 or respectively to the second part 8b of the arm 8. Furthermore, in the fifth embodiment of the device 1 two closure elements 10a, 10b are provided, which are both connected with the arm 8 in the previously described manner—i.e. via a feed-through of the closure elements 10a, 10b through a through-hole 16 of the arm 8, in particular of its second part 8b, with simultaneous alignment by pre-stressed spring elements 11a, 11b.

In the fifth embodiment of the invention, in addition, an actuator 18 is provided, which is arranged outside the housing 2 and has a rod 19, displaceable in longitudinal direction, which is introduced into the housing 2. There, the rod 19 is connected to the end of the third part 8c of the arm 8. The longitudinal movement of the rod 19 of the actuator 18 is therefore transferred from the third part 8c of the arm 8 via the joint 17' firstly to the second part 8b of the arm 8 and subsequently via the joint 17 to the first part 8a of the arm 8 which is pivotably mounted about the rotation axis 9.

Through the previously described arrangement, the device illustrated in FIG. 5a and FIG. 5b can assume two switch positions: In the first switch position, shown in FIG. 5a, the rod 19 of the actuator 18 is extended far, so that the second part 8b of the arm 8 diverts toward the right in the direction of the outlet 4b, wherein the closure element 10b closes the outlet 4b. The second switch position illustrated in FIG. 5b, on the other hand, makes provision that the rod 19 of the actuator 18 is retracted far, so that the second part 8b of the arm 8 is drawn toward the left in the direction of the outlet 4a, wherein the closure element 10a closes the outlet 4a. In this embodiment of the device 1 also, in addition to the two described switch positions, a neutral switch position is possible, in which both outlets 4a, 4b remain opened. As in the embodiment of the device 1 shown in FIG. 5a and FIG. 5b a total of 3 connections (one inlet 3 and two outlets 4a, 4b) are present and—apart from the neutral switch position—two switch positions are possible, this is a 3/2-way valve.

Figure 6:
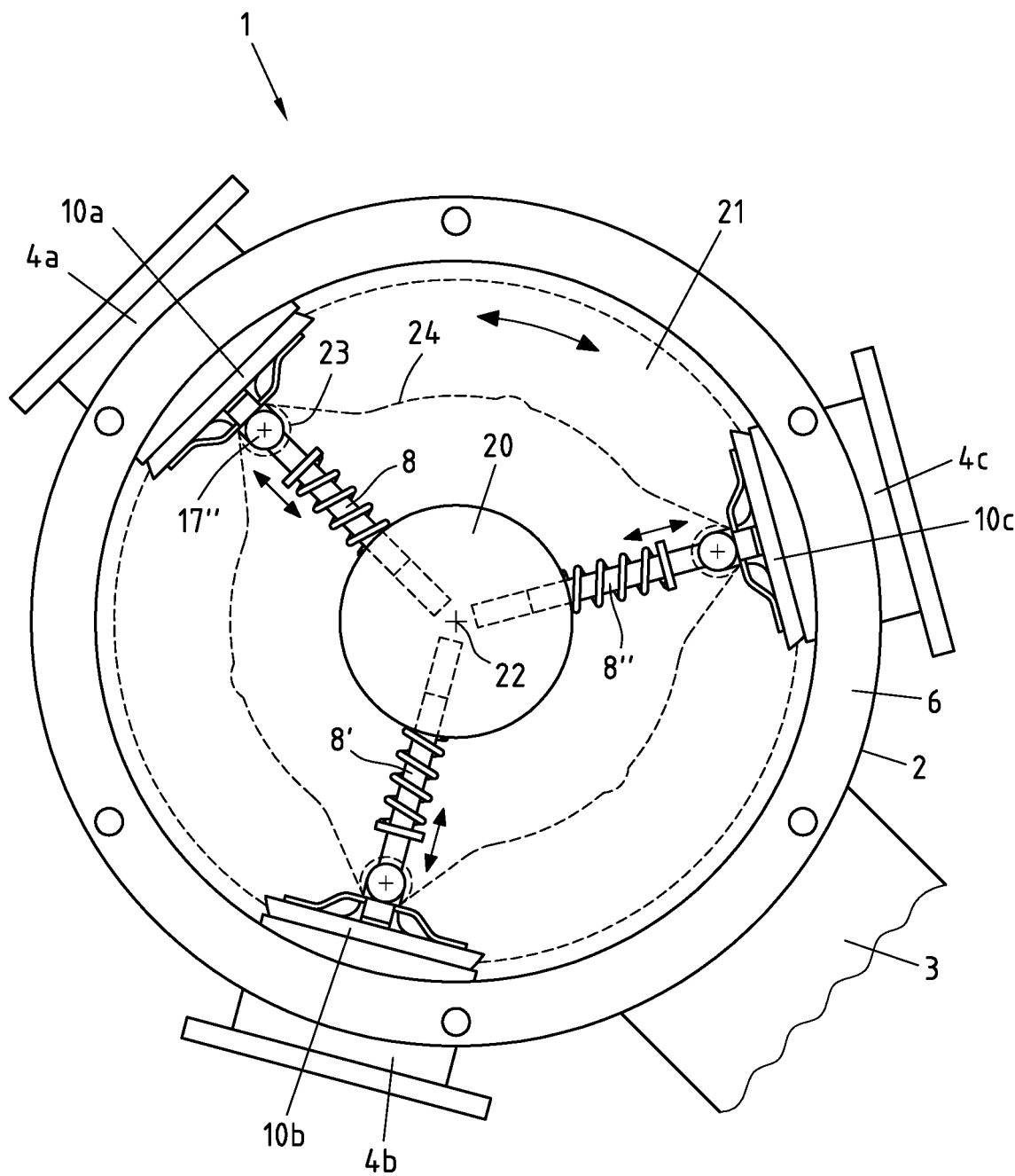

In FIG. 6 a sixth embodiment of a device 1 according to the invention is illustrated, in top view. The regions of the device 1 already described in connection with FIG. 1a to FIG. 5b are given corresponding reference numbers in FIG.

6. The sixth embodiment of the device 1 differs from the previously shown embodiments in particular in that three arms 8, 8', 8" are provided, which are movably connected with the housing 2 via a shared linear guide 20. Whilst the shared linear guide 20 is securely connected to the housing, each of the arms 8, 8', 8" are displaceable in longitudinal direction relative to the linear guide 20 (illustrated by an arrow respectively). The closing and opening of the three outlets 4a, 4b, 4c takes place by the arms 8, 8', 8" being displaced in longitudinal direction radially outward or inward. At the ends of the arms 8, 8', 8" respectively a closure element 10a, 10b, 10c is arranged, which can be pressed in this way onto the end 7a, 7b, 7c, projecting into the housing 2, of the outlet 4a, 4b, 4c associated therewith, in order to close it. The closure elements 10a, 10b, 10c are connected with the arms 8, 8', 8" respectively via a joint 17", in particular a ball joint. In addition, the closure elements 10a, 10b, 10c are aligned in the manner already previously described by spring elements 11a, 11b, 11c, which are arranged under pre-stressing between the closure elements 10a, 10b, 10c and a shoulder of the arms 8, 8', 8" provided for this.

The three arms 8, 8', 8" can be moved independently of each other in their longitudinal direction, so that the sixth embodiment of the device 1 can assume a plurality of switch positions. Preferably, the linear movement of the arms 8, 8', 8" is coupled to the rotary movement of an adjusting disc 21, which is mounted rotatably about a rotation axis 22 in the housing 2. This can be implemented for example in that on each arm 8, 8', 8" a guide element is fastened, embodied as a wheel 23 and arranged in the plane of the adjusting disc 21, which guide element, on a rotation of the adjusting disc 21, rolls or slides on an inwardly directed contour 24 of the adjusting disc 21 and in so doing presses inwards the arm 8, 8', 8" and the closure element 10a, 10b, 10c fastened thereon in radial direction against a spring pressure, or as a result of the spring pressure allows it to come outward again in radial direction. Detent points, which constitute a defined position for the wheels 23, can be provided on the contour 24 of the adjusting disc 21.

Figure 7:
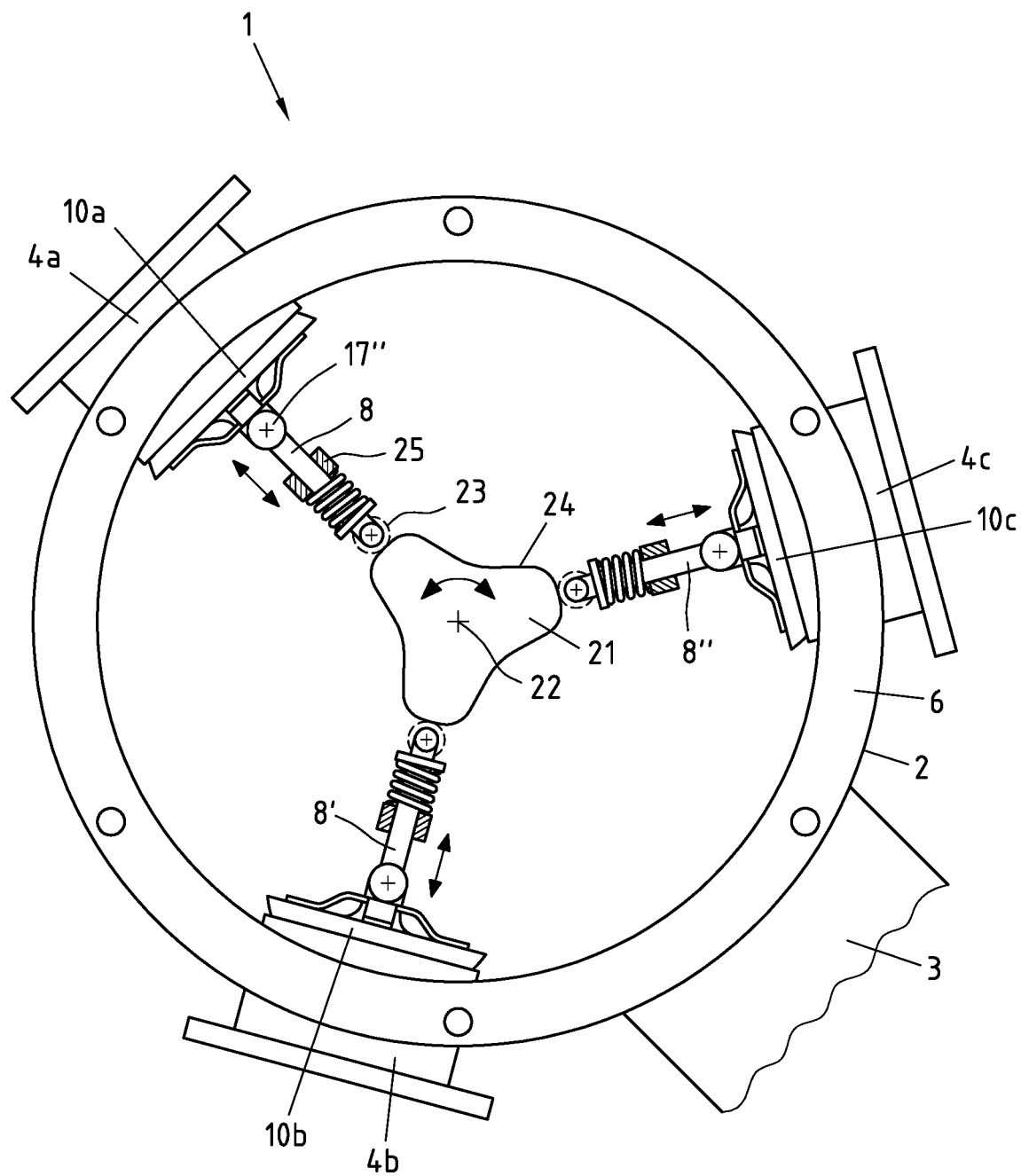

FIG. 7, finally, shows a seventh embodiment of a device 1 according to the invention, in top view. The regions of the device 1 already described in connection with FIG. 1a to FIG. 6 are given corresponding reference numbers in FIG. 7. The seventh embodiment of the device 1 differs from the sixth embodiment by the activation of the arms 8, 8', 8". In the seventh embodiment, the shared, centrally arranged linear guide 20 is dispensed with; instead, the arms 8, 8', 8" are movably connected with the housing 2 via separate, externally arranged linear guides 25. Whilst each linear guide 25 is securely connected with the housing 2, each of the arms 8, 8', 8" is displaceable in longitudinal direction relative to the linear guide 25 (illustrated respectively by an arrow). Also in the seventh embodiment of the device 1 the linear movement of the arms 8, 8', 8" is coupled to the rotary movement of the adjusting disc 21, which in turn is rotatably mounted about a rotation axis 22 in the housing 2 (illustrated by an arrow). Also in the seventh embodiment, this is implemented in that on each arm 8, 8', 8" a guide element, constructed as a wheel 23, is fastened, which on a rotation of the adjusting disc 21 rolls or slides on the contour 24 of the adjusting disc 21. However, in contrast to the sixth embodiment, the contour 24 in the seventh embodiment is directed outward, so that the wheel 23 rolling or sliding on it presses outwards the arm 8, 8', 8" and the closure element 10a, 10b, 10c, fastened thereon, in radial direction against a spring pressure, or allows it to come inward again in radial direction owing to the spring pressure. In the seventh embodiment, therefore, the adjusting disc 21 has similarities to a camshaft.

Both in the sixth embodiment (FIG. 6) and also in the seventh embodiment (FIG. 7) of the device 1, additional springs can be dispensed with—apart from the spring elements 11a, 11b, 11c. Instead, the adjusting discs 21 can be configured such that the wheels 23 slide on both sides on a correspondingly shaped contour 24 of the adjusting discs 21 and can therefore be positively guided radially inward and radially outward.

In all the previously illustrated and described embodiments, the inlets 3 and outlets 4a, 4b, 4a', 4b', 4c can be interchanged arbitrarily; in particular also two or more inlets 3 can be provided, which can also be opened simultaneously.

LIST OF REFERENCE NUMBERS

1: device
2: housing
3: inlet
4a, 4b, 4a', 4b', 4c: outlet
5a, 5b, 5a', 5b', 5c: flange (on the inlet or outlet)
6: flange (on the inlet or outlet)
7a, 7b, 7a', 7b', 7c: end (of the inlet or outlet)
8, 8', 8": arm
8a, 8b, 8c: parts (of the arm)
9, 9': rotation axis
10a, 10b, 10a'10b', 10c: closure element
11a, 11b: spring element
12a, 12b: sealing surface
13: chamfer
14', 14": edges
15a, 15b: sphere surface
16: through-hole
16a, 16a', 16b, 16b': distance
17, 17', 17": joint
18: actuator
19: rod
20: linear guide
21: adjusting disc
22: rotation axis
23: wheel
24: contour (of the adjusting disc)
25: linear guide
D: diameter (of the adjusting disc)
$D_{max}$: maximum diameter (of the closure element)
$D_{min}$: minimum diameter (of the closure element)
S: axis of symmetry

The invention claimed is:

1. A device for controlling or regulating a through-flow amount and/or through-flow direction of fluids, comprising:
a housing with at least two inlets and/or outlets,
at least one arm movably arranged within the housing,
at least one closure element, which is arranged within the housing and movably connected with the arm, and
a pre-stressed spring element is arranged between the arm and the closure element,
wherein the arm and the closure element connected therewith are arranged and connected with one another such that at least one inlet and/or outlet is able to be closed off by the closure element,
wherein the closure element and/or at least one inlet and/or outlet has a spherical sealing surface for sealing the inlets and/or outlets, and
wherein the closure element is movably connected with the arm via a ball joint.

2. The device according to claim 1,
wherein
the arm has at least one through-hole, through which two closure elements arranged on opposite sides of the arm are connected with one another.

3. The device according to claim 2,
wherein
the through-hole has a diameter which is greater than a minimum diameter of the two closure elements which are connected with one another.

4. The device according to claim 2,
wherein
the through-hole has a diameter which is smaller than a maximum diameter of the two closure elements which are connected with one another.

5. The device according to claim 1,
wherein
the arm is pivotable about a rotation axis which has a fixed position relative to the housing.

6. The device according to claim 1,
wherein
the inlets and/or outlets are constructed in a circular shape at their ends arranged in the housing.

7. The device according to claim 1,
further comprising:
an actuator for moving the arm, wherein the actuator is arranged outside the housing.

8. The device according to claim 7,
wherein
the actuator is mechanically connected with the arm.

9. The device according to claim 2,
wherein
the arm is pivotable about a rotation axis which has a fixed position relative to the housing.

10. The device according to claim 3,
wherein
the arm is pivotable about a rotation axis which has a fixed position relative to the housing.

11. The device according to claim 2,
further comprising:
an actuator for moving the arm, wherein the actuator is arranged outside the housing.

12. The device according to claim 3,
further comprising:
an actuator for moving the arm, wherein the actuator is arranged outside the housing.

13. The device according to claim 4,
further comprising:
an actuator for moving the arm, wherein the actuator is arranged outside the housing.

14. A method for controlling or regulating a through-flow amount and/or a through-flow direction of fluids in a sterilization of food packagings and/or a filling material thereof using the device of claim 1, the method comprising:
moving the arm within the housing to sealingly position at least one closure element connected to the arm over the at least one inlet or outlet.

15. A device for controlling or regulating a through-flow amount and/or through-flow direction of fluids, comprising:
a housing with at least two inlets and/or outlets,
at least one arm movably arranged within the housing,
at least one closure element, which is arranged within the housing and movably connected with the arm, and
a pre-stressed spring element is arranged between the arm and the closure element,
wherein the arm and the closure element connected therewith are arranged and connected with one another such that at least one inlet and/or outlet is able to be closed off by the closure element,
wherein the closure element and/or at least one inlet and/or outlet has a spherical sealing surface for sealing the inlets and/or outlets, and
wherein
the arm comprises at least two parts movably connected with one another, wherein a first part is pivotable about a rotation axis, which has a fixed position relative to the housing, and wherein a second part and each further part is pivotable about at least one rotation axis, which has a fixed position relative to an adjacent part.

16. The device according to claim 15,
wherein
at least one closure element is movably connected with the first part of the arm and/or that at least one closure element is movably connected with the second part and/or with each further part of the arm.

17. A device for controlling or regulating a through-flow amount and/or through-flow direction of fluids, comprising:
a housing with at least two inlets and/or outlets,
at least one arm movably arranged within the housing,
an actuator for moving the arm, wherein the actuator is arranged outside the housing,
at least one closure element, which is arranged within the housing and movably connected with the arm, and
a pre-stressed spring element is arranged between the arm and the closure element,
wherein the arm and the closure element connected therewith are arranged and connected with one another such that at least one inlet and/or outlet is able to be closed off by the closure element,
wherein the closure element and/or at least one inlet and/or outlet has a spherical sealing surface for sealing the inlets and/or outlets,
wherein the actuator is mechanically connected with the arm, and
wherein
the actuator is coupled in a contact-free manner, with the arm.

18. The device of claim 17, wherein:
the actuator is coupled magnetically with the arm.

19. A device for controlling or regulating a through-flow amount and/or through-flow direction of fluids, comprising:
a housing with at least two inlets and/or outlets,
at least one arm movably arranged within the housing,
at least one closure element, which is arranged within the housing and movably connected with the arm, and
a pre-stressed spring element is arranged between the arm and the closure element,
wherein the arm and the closure element connected therewith are arranged and connected with one another such that at least one inlet and/or outlet is able to be closed off by the closure element,
wherein the closure element and/or at least one inlet and/or outlet has a spherical sealing surface for sealing the inlets and/or outlets, and
wherein
several arms are movably connected with the housing via a shared linear guide or via respectively a separate linear guide.

20. The device according to claim 19,
further comprising:

at least one adjusting disc, rotatably connected with the housing, with at least one outwardly or inwardly directed contour for a radial displacement of the arms.

\* \* \* \* \*